Dec. 22, 1931.    C. CHAMBERS, JR    1,837,895
CORN PLANTER RUNNER

Filed April 7, 1928

Inventor
Charles Chambers, Jr.
By Deane & Custer
his Attorneys

Patented Dec. 22, 1931

1,837,895

UNITED STATES PATENT OFFICE

CHARLES CHAMBERS, JR., OF FLORA, INDIANA

CORN PLANTER RUNNER

Application filed April 7, 1928. Serial No. 268,234.

This invention relates to seed planters, and more particularly to an improved corn planter runner, the object of which is to provide means for the application of commercial fertilizer at the same time the corn or seed of other crop is planted by the modern corn planter, and to deposit the fertilizer at a greater depth than the seed is planted, and also to provide a substantial separating wall or barrier of soil between the seed and the fertilizer.

The advantages of this method of fertilizing is to promote a deeper root growth, to lessen the danger of the drying out of the fertilizer, to prevent the killing of the seed germs by the chemical action of the fertilizer, and to avoid the feeding on the fertilizer by small weeds that sprout near the surface of the soil.

This invention consists in the special form and construction of the runner and of an attachment thereto as illustrated in the accompanying drawings, Figure 1 being a side view showing all parts assembled with a seed hopper and fertilizer hopper of customary design and arrangement having spouts extending downwardly therefrom and in engagement with this invention.

Throughout the description and drawings the same number is used to refer to the same part.

Figure 1:
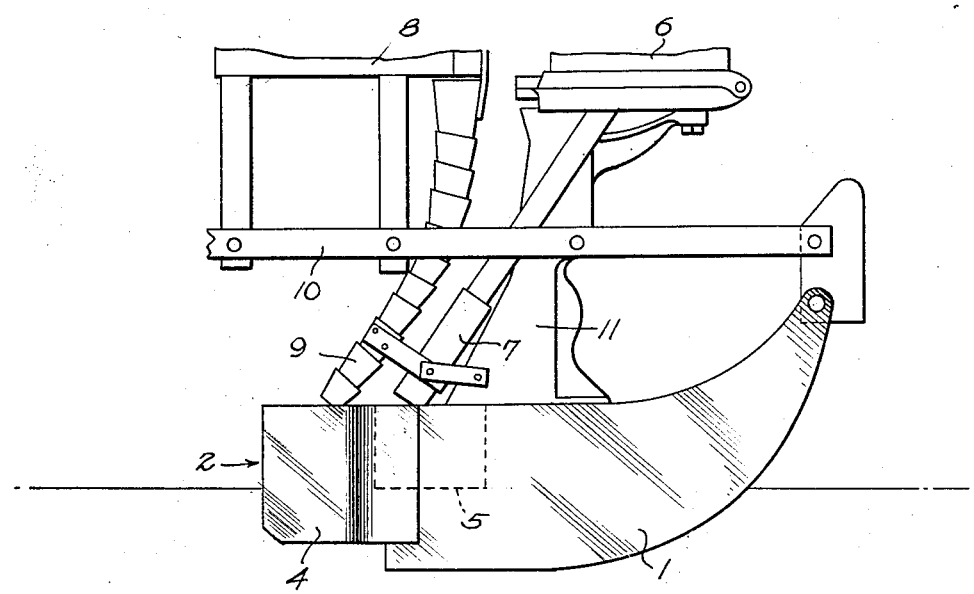
Figure 2:
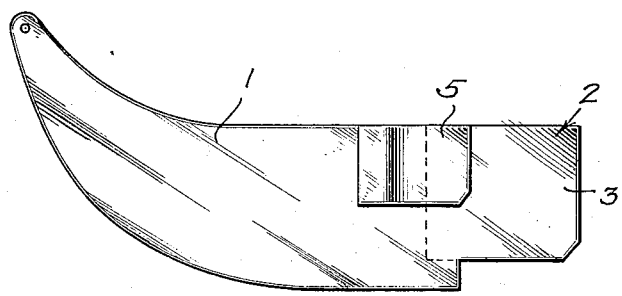
Figure 2 is a side view of this invention showing the attachment as an integral portion or permanently attached to an ordinary runner made somewhat longer and wider than usual.
Figure 3:
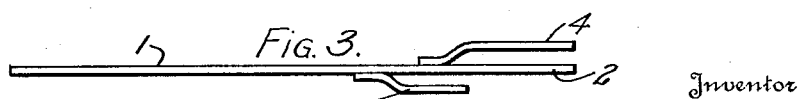
Figure 3 is a plan view of the runner illustrated in Fig. 2.

Considering the drawings, Figures 1 and 2 illustrate an auxiliary runner 1, made longer and wider than the regulation runner of the planters now constructed and sold. The rear opening of the runner 1 may advantageously contain or be attached to a short shank or housing permanently, for the valve necessary for hilling or drilling the fertilizer, also for the reception of the flexible tube extending downwardly from the fertilizer hopper, and to provide better means for attaching the runners together at their rear extremities. The rear opening of the runner 1 is marked 2, and its vertical sides are designated 3 and 4. On the side of the runner 1 at a distance from its rear end and in line with the top edge of the runner is an attachment 5. It is shown as integral or attached permanently, but may obviously be secured removably in any manner. An additional opening for a spout, as illustrated, for the seed spout, is thus provided at the side of the runner 1, the side or wall of the attachment 5 being spaced from the side of the runner 1.

As set out in Figure 1, the seed hopper 6 has the spout 7, and the fertilizer hopper 8 has the spout 9. The hoppers are carried by the frame 10 of the planter, and suitable connecting members 11 are provided to support the runner 1. It is to be understood that this invention is not to be confined to any particular construction of the hoppers, or the machine frame or the supporting devices for the runner, as those parts are now manufactured and sold in a variety of forms on different planters.

In the operation of this invention it will be understood that the seeds are deposited by way of the opening formed by the attachment 5 on the runner 1, and that the runner as shown and described turns the soil deeper and follows with a deposit of fertilizer at a greater depth than the seed is planted, and at the same time there is provided a substantial separating wall or barrier of soil between the seed and the fertilizer accomplishing the purposes set forth.

Having now described this invention and explained the mode of its operation, I claim:—

1. In a seed planter, a runner having a spaced-wall formation at the rear end for the guided delivery and deposit at a predetermined depth of fertilizer, and a member secured to the runner proper and providing with the runner a spaced-wall formation for the guided delivery of seed, the spaced-wall formation for the seed delivery being offset longitudinally relative to the spaced-wall formation for the delivery of the fertilizer and terminating at its lower delivery edge materially above the lower delivery edge of the latter.

2. A runner for seed planters comprising a runner element provided at its rear end with a spaced-wall formation to provide a fertilizer delivering element open at the lower end for delivery of the fertilizer at a predetermined depth, said fertilizer delivery element being arranged wholly at one side of the plane of the runner, and a plate secured to the runner on the side opposite that of the fertilizer delivery element, said plate being offset from the runner to define with the runner a spaced-wall formation providing a seed delivery element, the lower edge of the plate being materially above that similar edge of the fertilizer delivery element, whereby the seed and fertilizer are delivered at different depths and in offset planes relative to the runner path.

In testimony whereof I affix my signature.

CHARLES CHAMBERS, Jr.